Oct. 21, 1969

C. E. HAUBER ET AL 3,473,862

OPTICAL SCREEN ORBITAL MOVEMENT SYSTEM

Filed March 6, 1967

INVENTORS
Charles E. Hauber
Raymond E. Kittredge

BY William Grobman

ATTORNEY

INVENTORS
Charles E. Hauber
Raymond E. Kittredge

BY William Grobman

ATTORNEY

Oct. 21, 1969    C. E. HAUBER ET AL    3,473,862
OPTICAL SCREEN ORBITAL MOVEMENT SYSTEM
Filed March 6, 1967    3 Sheets-Sheet 3

INVENTORS
Charles E. Hauber
Raymond E. Kittredge

BY *William Grolman*

ATTORNEY

United States Patent Office 3,473,862
Patented Oct. 21, 1969

3,473,862
OPTICAL SCREEN ORBITAL MOVEMENT SYSTEM
Charles E. Hauber, Orchard Park, and Raymond E. Kittredge, Binghamton, N.Y., assignors to Singer-General Precision, Inc., Binghamton, N.Y., a corporation of Delaware
Filed Mar. 6, 1967, Ser. No. 620,796
Int. Cl. G03b 21/56
U.S. Cl. 350—120    5 Claims

ABSTRACT OF THE DISCLOSURE

Very often the single portion of an optical projection system which most limits the amount of resolution is the graininess of the screen upon which the image is projected. This specification discloses several systems for moving the projection screen so that the graininess, in effect, disappears due to the retentivity of the human eye. In general, the individual systems utilize an orbital movement of the screen so that the grains appear to overlap and merge. Of the various embodiments shown, most use eccentric drives and mount the frame or the screen itself for movement about any of several points. The various embodiments differ in the manner in which the drive is effected and in the manner in which the screen is supported for movement.

---

This invention relates to new and improved optical projection systems, and, more particularly, to systems in which the projection screen upon which an image appears is moved to effect an improved resolution of the image.

In the past, one of the limiting factors in the study of projected images from transparencies has been the graininess of the projection screen. This is particularly true when very small images or small portions of an image are being studied. In general, present day lenses are sufficiently superior to afford a very high resolution of a projected image. Modern transparencies are made from amorphous photosensitive materials rather than ones which have crystalline or grain structure. Therefore, the present day photographic transparencies are also capable of very high resolution. When trying to identify individual minute portions of a projected image, the portion to be identified is often no larger than an average size grain in the screen itself. Even when using a clearly transparent screen which has a diffusing material dispersed evenly over one surface, the grain of the diffusing material approaches the size of very small images.

It becomes important in the study of photographs made of large areas to identify very small portions thereof. In the past this has been very difficult due to the lack of sufficient resolution in the equipment to study the photographs. However, this invention produces a device for improving the resolution of a standard projection screen, preferably a translucent rear-projection screen, for increasing its resolution and thereby permitting a study of the smaller elements of the image.

It is an object of this invention to provide a new and improved optical system for projected images.

It is another object of this invention to provide a new and improved optical system for projected images in which the resolution of the projection screen is improved.

It is a further object of this invention to provide a new and improved projection system for projected optical images in which system several arrangements are provided for effectively eliminating the effect of the graininess upon the image on the screen.

Other objects and advantages of this invention will become apparent as the following description proceeds, which description should be considered together with the accompanying drawings in which.

Figure 1:
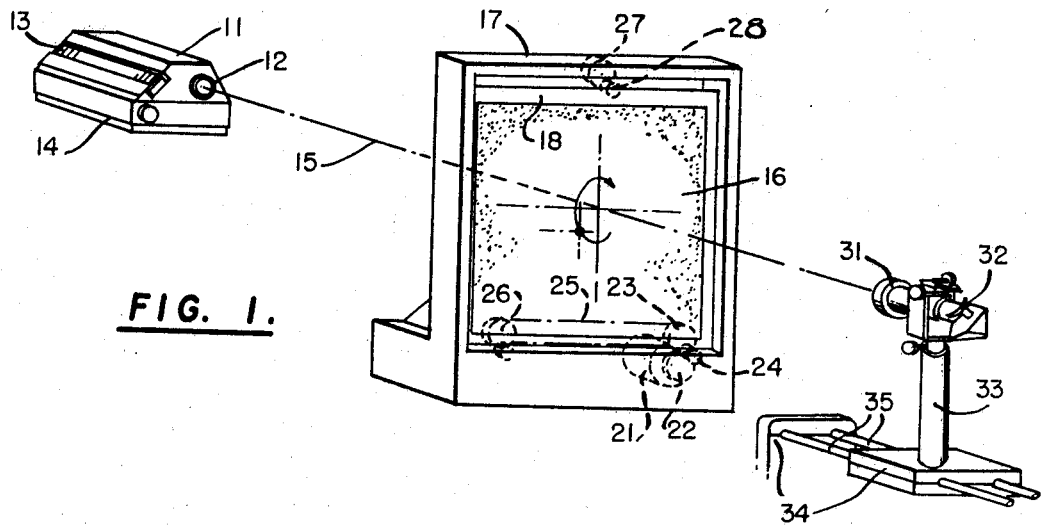
FIG. 1 is a perspective view of an optical projection system in which the projection screen utilizes the principles of this invention.

Referring now to the drawings in detail, and more particularly to FIG. 1, the reference character 11 designates a transparency projector which includes a lens system 12 and a transparency magazine 13. The projector 11 is supported upon any suitable surface 14 which may be a tabletop, a floor or the like. The image projected by the projector 11 is projected along an optical axis designated by the reference character 15 so that the image impinges upon a screen 16 which is supported in its frame 18. The frame 18 is surrounded by a larger, stable frame 17 the bottom of which supports a motor 21 having a gear drive 22, shown in greater detail in FIG. 2. The gear 22 meshes with a wheel 23 having an eccentrically mounted cam 24 and having wrapped about it a belt 25. The belt 25 is also wrapped around a second pulley 26 which has a separate eccentrically mounted pin. The two wheels 23 and 26 are mounted at the bottom of the frame 18, and centrally located along the top edge of the frame 18 is a third wheel 27 having an eccentrically mounted drive roller 28. The image on the screen 16 may be viewed through a telescope 31 which has an erecting eyepiece 32. The telescope 31 may be supported by any suitable means such as the telescoping tube 33 on a base 34 which includes rails 35.

In operation the projector 11, which includes a light source, not shown, projects a light through a transparency mounted in the path between the light source and the lens 12. In the operation of FIG. 1 the projector 11 contains a suitable light source, not shown. A transparency from the magazine 13 is interposed between the light source in the projector 11 and the lens system 12 so that the light passing through the transparency projects an image through the lens 12 along the optical axis 15 onto the screen 16. The screen 16 is usually a semitransparent rear projection screen in which the diffusing surface is, as a general rule, closest to the lens system 12 and is the surface upon which the image is focused. The telescope 31 may be used as an alignment telescope or as a means for studying the fine details of the projected and enlarged image which appears upon the screen 16. The support 33 is telescoping and is adjustable to change the height of the telescope 31. In addition, the telescope 31 may be rotated upon the axis of the tubular support 33, and the entire assembly may be slid back and forth on the rails 35. The erecting eyepiece 32, which incorporates a prism, not shown, shows the image which appears on the screen 16 in an upright position. The motor 21 is energized to drive the gear 22 causing the disc 23 and the disc 25 to rotate. However, for a better understanding of this equipment reference should be had to FIG. 2.

Figure 2:
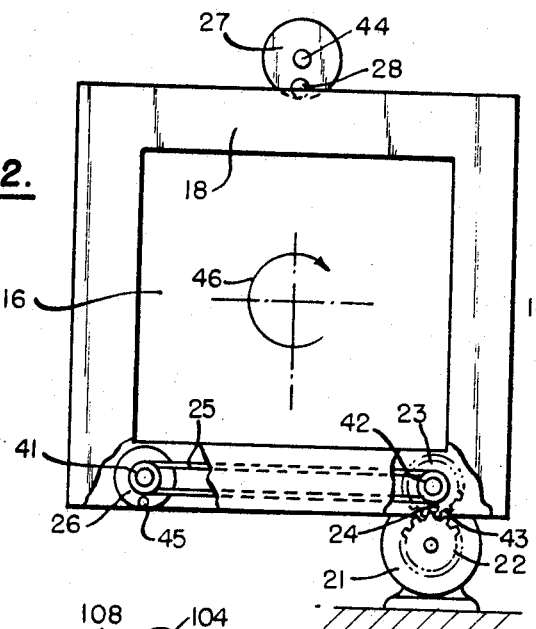
FIG. 2 is an elevationanl view of an enlarged portion of the screen of FIG. 1 showing in greater detail the driving mechanism.

In FIG. 2 the outer frame 18 of the screen 16 is shown broken away at the bottom to better illustrate the relationship of the wheels 26 and 23. The wheel 23 includes a pulley 41 over which passes the belt 25, and the wheel 23 includes a similar pulley 42, within the belt 25. The outer edge of the wheel 23 includes a spur gear shown at 43 which is driven by the meshing gear 22 mounted on the shaft of the motor 21. Centrally located along the top edge of the frame 18 is the wheel 27 with its eccentrically mounted roller 28. The disc 27 is pivotally mounted on a shaft 44.

When the motor 21 is energized, the gear 22 rotates and drives the gear 43 which meshes with it. This, in turn, causes the wheel 23, carrying the eccentrically mounted pin 24, to rotate. As the wheel 23 and its pulley 42 rotate, they drive the belt 25, which, in turn, drives the wheel 26 and its eccentrically mounted pin 45. The eccentrically mounted pins 24 and 45 of the wheels 23 and 26 are socketed in holes in the back portion of the frame 18. The frame 18 is suitably mounted within the outer frame 17, in grooves formed for the purpose or by a suitably movable suspension system, so that as the pins 24 and 45 move about their respective axes, they drive the frame 18. As shown by the arrow 46 in the center of the screen 16, the general movement of the screen 16 is circular, generally about its center. The wheel 27 has its pin 28 also inserted in a hole in the back of frame 18, but it is not driven. The wheel 27 is an idler disc which serves to stabilize the frame 18. As the motor 21 is energized, the pins 24 and 45 drive the frame 18 in a circular path. The drive rate should be somewhere in the neighborhood of 20–50 cycles or revolutions per second. At this rate, the movements of the individual grains become invisible due to the retentivity of the eye itself. The eye tends to integrate the movements so that, in effect, there is imparted to the grains an overall smoothness or merging to give the effect of a uniform surface which still has the capability of diffusing light. The screen 16 on the frame 18 can be supported by only the pins 24, 28 and 45, if the frame 18 is made sufficiently smaller than the overall frame 17 of FIG. 1 to provide it with sufficient room to move. It is necessary to drive the frame 18 only from two points. If the frame 18 were driven only from a single point, say from the pin 24, then there would be a tendency to bind, because the frame 18 itself would be driving the wheels 26 and 27. However, with the belt 25 transferring power from the pulley 42 to the pulley 21, and thereby to the disc 26 and the pin 45, so that the pin 45 and the pin 24 rotate in synchronism, the frame 18 is driven along its lower edge, and this provides much smoother motion. Once the motion of the frame has been initiated, and the wheel 27 is freely rotating, the wheel 27 serves as a stabilizing means to help keep the frame 18 from binding in its movements. All that is required in the frame 17 is sufficient room, or the frame 17 can be provided with grooves to provide the frame 18 with sufficient space for this purpose.

Figure 3:
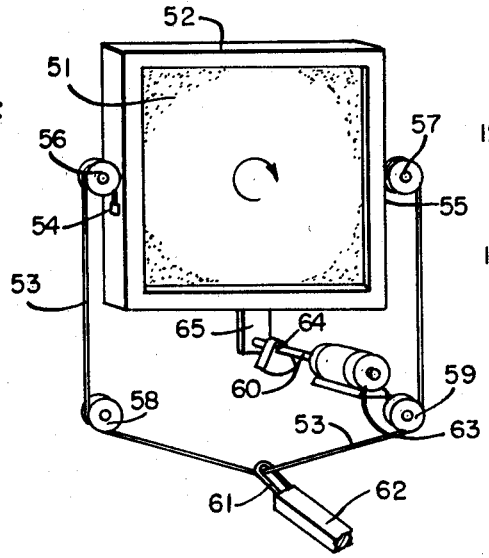
FIG. 3 is an elevational view, partially in perspective of another embodiment of a system for supporting and driving the screen.

In FIG. 3 another embodiment of this invention is shown in an elevational perspective view. A frame 52 contains a screen 51 which is mounted on cable 53 attached at two points 54 and 55 to the sides of the frame 52. The cable 53 is passed over pulleys 56, 57 which are on either side of the frame 52, over pulleys 58 and 59, and through a loop 61 connected to a spring member 62. The pulleys 56, 57, 58 and 59 are pivotally mounted on a base of suitable size and shape, which base is not shown to keep the drawing as simple as possible. Thus, the cable 53 passing over the pulleys 56 and 57 supports the frame 52. The pulleys 58 and 59 are idler pulleys to guide the cable into a convenient configuration to provide the frame 52 with sufficient space for movement. By passing the cable 53 through the opening 61, the torsion spring 62 tensions the cable and keeps is taut and free of lost motion. A motor 63 having a flexible shaft 60 upon which is mounted an unbalanced mass 64, drives the shaft 60, and the vibrations established by the unbalanced mass 64 are transmitted to a base member 65 which is attached to the frame 52.

In operation, the motor 63 is energized causing the mass 64 to rotate on the motor shaft. Since the mass 64 is an unbalanced weight, the base 65 and everything attached to it is caused to vibrate. The flexible shaft 60 isolates the motor 63. Since the mass 64 rotates in a circle, the vibration is circular also. This vibration is transmitted through the base 65 to the frame 52, causing the frame 52 to move in a generally circular motion. Since the frame 52 is suspended by means of the cable 53, it is free to move so long as a movement of one end of the cable 53 is compensated by an opposite movement at the other end of the cable. As mentioned above, the spring member 62 maintains the cable 53 taut so that there is no lost motion and slapping. One disadvantage of the device of FIG. 3 is the fact that, for best operation, the shaft of the motor 63 should pass through the center of gravity of the movable system. This would require a counterweight situated below the frame 52, and this is considered an unnecessary device and additional weight and cost.

Figure 4:
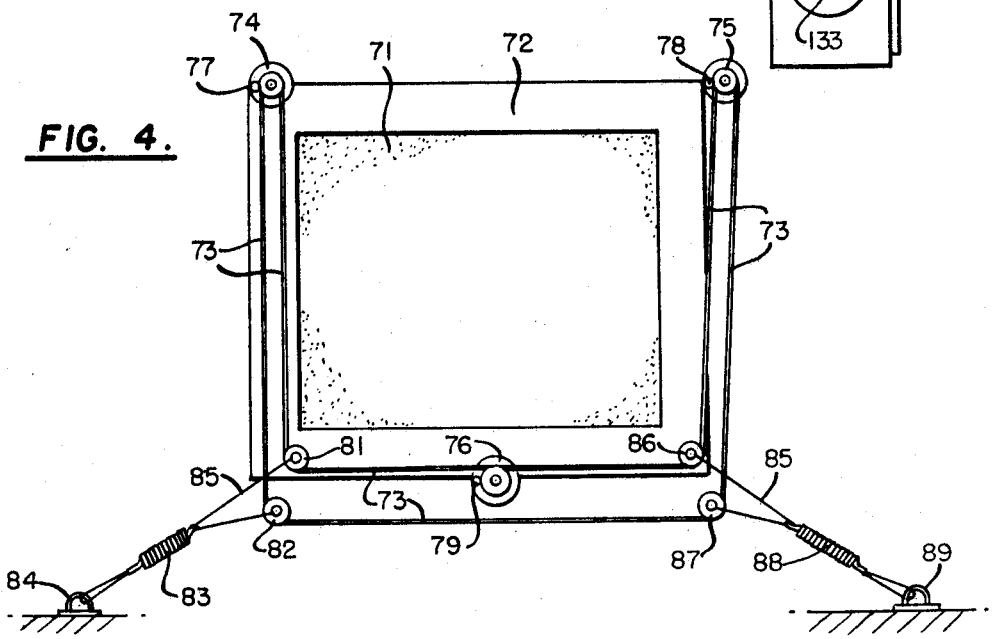
FIG. 4 is an elevational view of a further embodiment of this invention showing the screen driven from three points.

FIG. 4 shows in elevational view another form which the drive system of this invention can assume. A frame 72 carries a screen 71. Pulleys 74 and 75 are mounted adjacent the upper corners of the frame 72 with pins 77 and 78 mounted in appropriate openings in the back of the frame 72. The view of FIG. 4 is a back view which shows the mechanism, behind the frame 72, which causes it to move. A cable 73 passes over the pulleys 74 and 75 and over additional pulleys 81, 82, 86 and 87 which are situated in the adjacent lower corners of the frame 72. In addition, the cable 73 passes over a pulley 76 which has an eccentrically located pin 79 also passing into an appropriate opening in the back of the frame 72. The cable is an endless cable so that it is free to continuously move. The idler pulleys 81 and 82 are fastened by means of a cable 85 to a coil spring 83 which is stretched and fastened to an anchor 84 which may be attached to any suitable frame member. Similarly, pulleys 86 and 87 are attached by a cable 85 to a second coil spring 88 which is anchored to a base 89.

In operation, the pulley 76 is driven by means of a motor (not shown) connected to it. As the pulley 76 rotates, it causes the cable 73 to also move, driving the cable 73 over the pulleys 74 and 75 so that they, also, rotate. The rotation of the three pulleys 74, 75 and 76 causes rotation also of the eccentrically mounted pins 77, 78 and 79. Since the eccentrically mounted pins are positioned in openings in the rigid frame, 72, they drive the rigid frame 72 in a generally circular path. The use of the cable 73 synchronizes the movements of the three individual wheels 74, 75 and 76 so that all three move together and there is no binding in the system. The use of the coil springs 83 and 88 on the idler pulleys 81, 82, 86 and 87 maintains the cable 73 taut so that there is no lost motion or slapping. This also provides less slippage in driving the pulleys 74 and 75.

Although the fewer number of pivot points or driving points which are used to drive the frame 72, the better, it is sometimes difficult to use less than three pivot points without causing the system to bind. FIG. 3 showed a system using two pivot points and FIG. 4 shows a system using three pivot points. The system of FIG. 2 also uses three pivot points, but in that system the top pivot was an idling pivot which was not driven. This caused the system to occasionally bind unless it was made to extremely close tolerances, and this was quite an expensive operation. The system of FIG. 4 is an improvement thereover because all three of the driving members 74, 75 and 76 are driven synchronously by means of the cable 73. The system of FIG. 3 has the advantage of requiring only two pivot points but it has the added disadvantage mentioned above of requiring the motor shaft to pass through the center of gravity of the moving system. The embodiments shown in FIG. 5, which is a front elevational view of a frame 102 supporting a screen 101, includes four wheels, 103, 104, 105 and 106, rotatably mounted at each of the four corners of the frame 102. Each of the wheels 103, 104, 105 and 106 has mounted on it, eccentrically with respect to the center of rotation of the wheel, a rotary pin, respectively designated 107, 108, 109 and 111.

Figure 5:
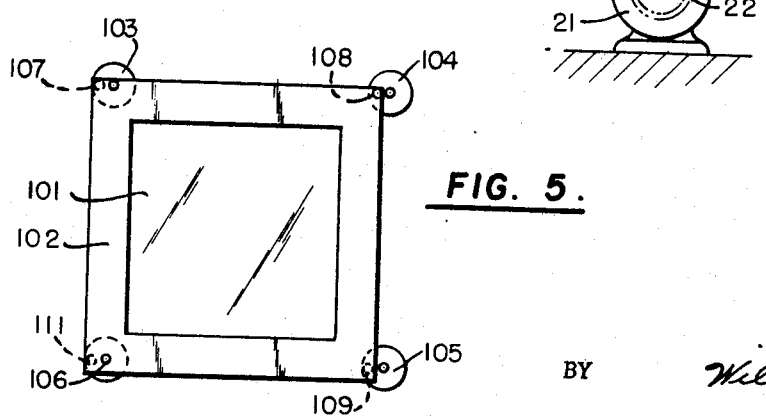
FIG. 5 is an elevational view in schematic form showing another embodiment of the drive means of this invention in which the screen is driven from each of its four corners.

The device shown in FIG. 5 supports the frame 102, in which the screen 101 is carried, at each of its four corners by means of an eccentric cam. In this case it would be feasible to drive the entire system from a single motor and use belts transmitting the synchronous power from the motor to each of the four wheels 103, 104, 105 and 106. However, a simpler system is merely to drive one of the wheels, say, 105. The motion from the wheel 105 would then be transmitted to the frame 102 itself to each of the other eccentrically mounted pins 107, 108, 109 and 111 causing their respective wheels 103, 104, 105 and 106 to rotate. In the latter system there sometimes is encountered some binding of the frame 102 in its supports. Unless all of the wheels 103–106 are oriented in exactly the same manner so that the eccentric pins 107–111 are in exactly the same relative position, there is a tendency to exert energy other than in a rotary manner on each of the wheels. The use of a belt running around the four wheels 103–106 does help simplify this matter so long as there is no friction in the system and so long as the belt does not slip. This is a very simple configuration and if carefully made serves the purposes for which it is intended quite well.

Figure 6:
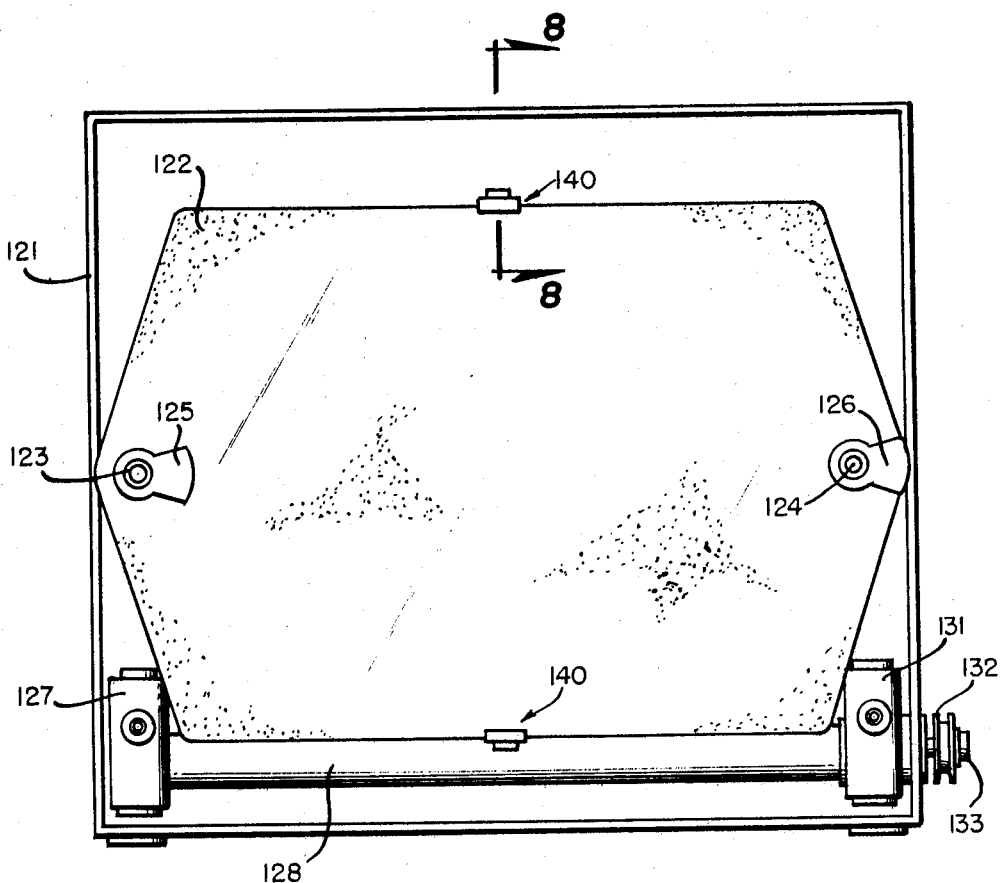
FIG. 6 is an elevational view of a preferred embodiment of this invention in which the screen is driven from two spaced points along its edges.

The preferred embodiment of this invention is shown broadly in FIG. 6 in which a screen 122 is mounted on a frame 121 at each of two points 123 and 124. The points 123 and 124 are located adjacent respective side edges of screen 122 and on a horizontal axis through the geometric center of the screen. Also mounted at the points 123 and 124 are counterweights 125 and 126.

Figure 8:
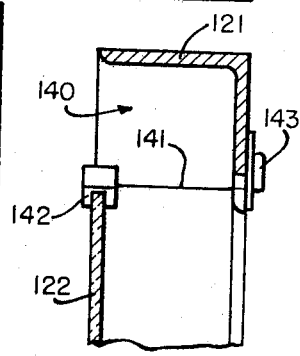
FIG. 8 is a fragmentary sectional view on line 8—8 of FIG. 6.

To preclude departure of screen 122 from its established plane and to prevent its vibration in a rotary mode about the axes of shafts 123 and 124 in sympathy with the orbital speed, a constraining assembly 140 is provided at the midpoint of either or, preferably, both the top and bottom edge of the screen. While two such assemblies are shown in FIG. 6, they are identical and, therefore, only one will be described, with reference to FIG. 8 which shows the significant structure on an enlarged scale.

Assembly 140 consists of a flexure element 141, which maybe a thin rod of spring material, a clamp member 142 secured to the edge of screen 122, and a second clamp member 143 secured to frame 121. The ends of flexure element 141 are clamped in the respective clamp members 142, 143 which are of any suitable design for this purpose. The flexibility of element 141 accommodates the orbital displacement of screen 122 while resisting any tendency of the screen to rotate or deflect from its plane.

The drive means is through the mounts 123 and 124 by means of a transmission train which comprises gearing in housings 127 and 131 connected together through a rotary shaft within housing 128. Power is applied to the system from a motor, not shown, through a pulley 132 which is drivingly coupled to the motor by means of a belt, also not shown. Pulley 132 drives a shaft 133 and the gearing in the housing 131 as well as the main drive shaft in housing 128. This also applies rotary motion to the gearing within housing 127.

Figure 7:
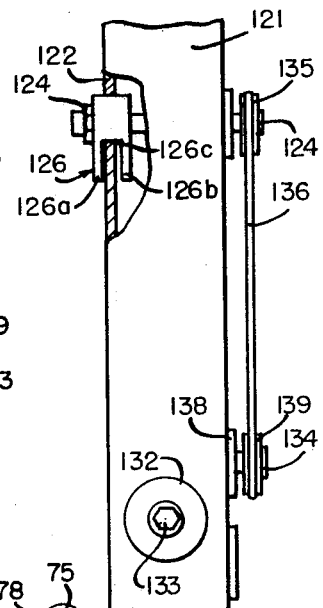
FIG. 7 is a side view of the embodiment of FIG. 6 showing the power transmission path.

FIG. 7 shows a side view of the apparatus of FIG. 6 in which the pulley 132 is shown at the bottom mounted on the shaft 133. The gearing which is in the housings 127 and 131 is of conventional type and need not be described in this application. A shaft 134 extends out of the housing 131 through a bearing 138 mounted on the frame 121. A pulley 139 is mounted on the shaft 134 and transmits power through a belt 136 to a pulley 135 mounted on the shaft 124. As shown in FIG. 6, one side of the screen 122 is also mounted on the shaft 124. The counterbalance assembly 126 is shown in a side view in FIG. 7 and comprises two counterweight lobes 126a and 126b, one on each side of the screen 122. For simplicity, the counterbalance assembly 126 has been shown here to also include the eccentric cam 126c. Thus, as the shaft 124 is driven through the pulley 135 orbital motion is also imparted to one side of the screen 122. Although not shown in the drawing, apparatus identical to that described in conjunction with FIG. 7 is provided on the opposite side of the screen also.

In operation, considering both FIGS. 6 and 7, a motor connected by means of a belt to pulley 132 causes the shaft 133 to rotate. This drives the gearing contained in the housing 131 and transmits rotary motion through the shaft in housing 128 to the gearing contained in the other housing 127. The contents of both housings 127 and 131 are identical. As shaft 133 rotates it causes a shaft 134 at right angles thereto also to rotate. This drives a pulley 139 over which a belt 136 passes transmitting rotary motion to a second pulley 135. The second pulley 135 causes the shaft 124 upon which it is mounted to rotate in its bearing 137. The rotation of the shaft 124 also causes the eccentric counterweight 126 to rotate in a suitable bearing, omitted from this drawing for the sake of simplicity, mounted in the screen 122. As the counterweights 126 rotate, the eccentric cam portion 17 arc causing the screen 122 to follow this motion. Since the orbital drive systems on both sides of the frame 121 are identical and are interconnected by means of the direct drive through the shaft in housing 128, shafts 123 and 124 rotate in synchronism causing no binding and imparting a smooth motion in the screen 12. For more positive rotation timing, pulleys and timing belts may be used, sprocket wheels and chains may be used, or direct drive through appropriate gearing may also be used.

The above specification has shown several embodiments of a new and improved system for decreasing the effect of the graininess of an optical projection screen upon the image itself to permit rare resolution of the image. It is realized that the above description may indicate to those skilled in the art additional ways in which the principles of this invention may be utilized without departing from its spirit. It is, therefore, intended that this invention be limited only by the scope of the appended claims.

What is claimed is:

1. Apparatus for ameliorating the adverse effects on the resolution of a projected image resulting from the surface grain of the projection screen, said apparatus comprising: means for movably supporting a projection screen upon which an optical image be projected; means for causing said optical screen to be moved in a generally symmetrical orbital motion about a central point on the screen with a total lateral displacement larger than the largest size surface grain encountered on said screen; and means to drive said orbital motion means at a speed which is sufficient to overcome the individual motion of the grains as viewed by the human eye, said means for causing orbital motion of said screen comprising a flexible shaft having one end rotatably mounted on said screen and an unbalanced mass mounted on said shaft to rotate therewith, said drive means comprising a motor connected to the other end of said shaft to cause said shaft to rotate, the rotation of said unbalanced mass causing said shaft to flex and said screen to move.

2. Apparatus for improving the resolution of an optical projection screen upon which an optical image is to be projected, said apparatus comprising: a screen upon which an optical image is to be projected; said screen having at least one surface of a type to diffuse a light impinging thereon, said diffusing surface comprising individual grains which deteriorate the resolution of the image itself; means for supporting said screen for lateral movement; means for causing said screen to move in an orbital fashion with a lateral displacement larger than the largest grain to be encountered on said surface, said means for causing movement comprising a rotatably mounted unbalanced mass, and means for resiliently coupling said mass to said screen; and means to drive said mass in rotation at a speed sufficiently large that the retentivity of the human eye effectively merges the motion of the individual grains into a smooth overall image.

3. The apparatus defined in claim 2 wherein said supporting means comprises an elongated flexible member attached at one end to one side of said screen and at the other end to the opposite side of said screen, means for movably restraining and guiding said member, and means for tensioning said member, said guiding means being non-movably supported.

4. The apparatus defined in claim 3 wherein said means for resiliently coupling comprises a flexible shaft having one end rotatably connected to said screen, said mass being mounted on said shaft to rotate therewith, and wherein said drive means comprises a motor connected to the other end of said shaft to rotate said shaft and said mass.

5. The apparatus defined in claim 2 wherein said means for resiliently coupling comprises a flexible shaft having one end rotatably connected to said screen, said mass being mounted on said shaft to rotate therewith, and wherein said drive means comprises a motor connected to the other end of said shaft to rotate said shaft and said mass, the rotation of said mass causing said shaft to flex and said screen to move.

References Cited

UNITED STATES PATENTS

| | | | |
|---|---|---|---|
| 1,772,782 | 8/1930 | Noaillon | 352—63 |
| 2,837,008 | 6/1958 | Erban | 350—120 |
| 3,125,927 | 3/1964 | Erban | 350—120 |
| 3,186,299 | 6/1965 | Parenti | 350—120 |

JULIA E. COINER, Primary Examiner

U.S. Cl. X.R.

350—117